United States Patent Office 2,874,017
Patented Feb. 17, 1959

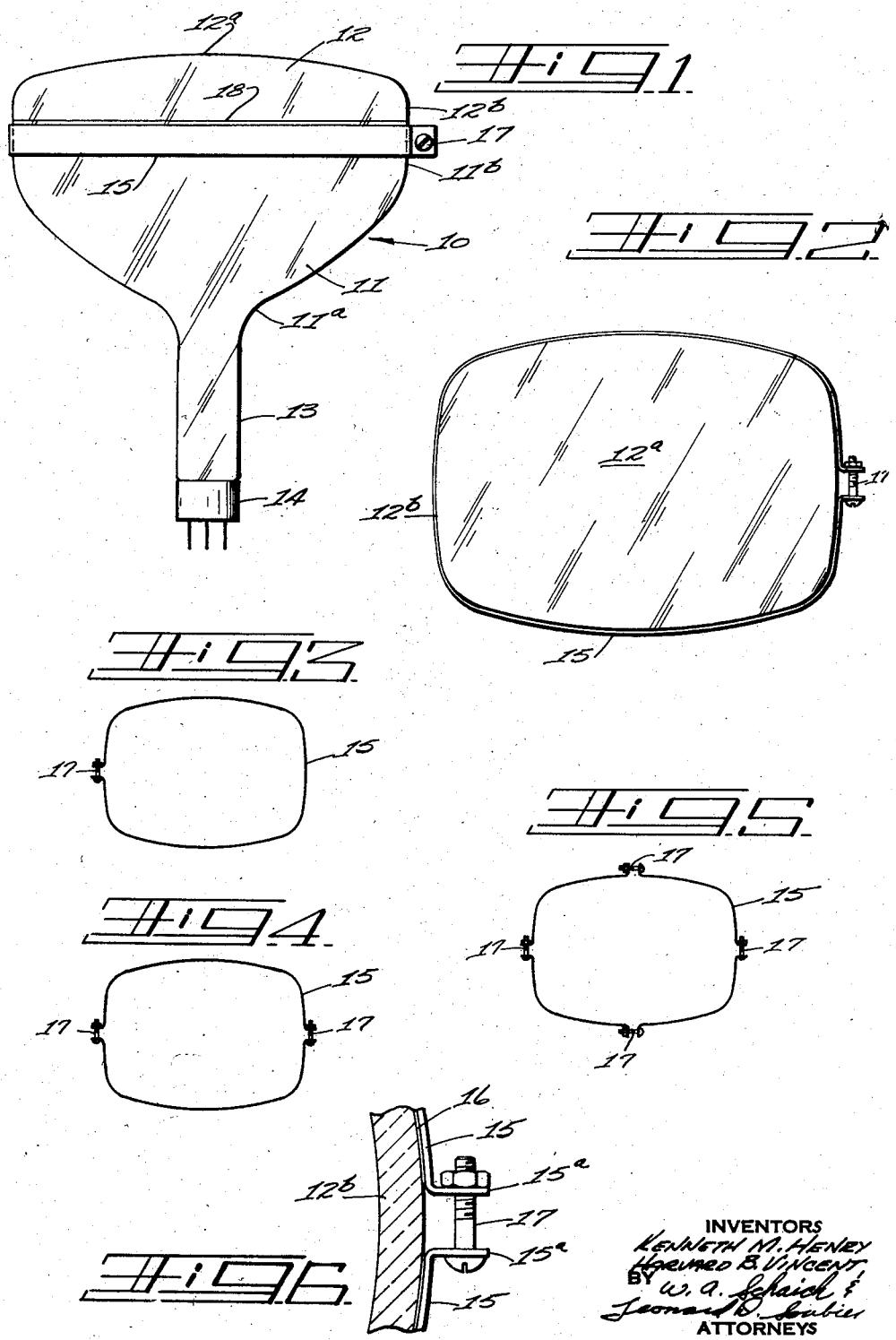

2,874,017

PREVENTION OF FRACTURE IN GLASS CATHODE-RAY TUBES

Kenneth M. Henry and Harvard B. Vincent, Toledo, Ohio, assignors to Owens-Illinois Glass Company, a corporation of Ohio Application November 7, 1956, Serial No. 620,973

3 Claims. (Cl. 316—19)

This invention relates to the control and prevention of breakage or fracture in evacuated and sealed glass cathode-ray television picture tubes or other types of sealed glass tubes or articles and more specifically to an improved method of eliminating breakage of such tubes in processing wherein internal pressure conditions are fluctuated.

During the manufacture of TV picture tubes, an assembly point is reached where each tube is evacuated to a high degree of vacuum with the resultant effect of creating high external pressures over extensive surface areas of the tube. The relative dimensions of these tubes are such that very substantial surface pressures are exerted on the glass and particularly on viewing and sealed portions. An example of the condition which exists in an evacuated 27" rectangular tube having a viewing portion alone which presents a surface area of approximately 400 square inches consists of total pressure on the viewing portion of approximately 5800 pounds. Such pressures make an evacuated tube highly subject to implosion upon fracture or breakage of the glass. Therefore, the tube and its seals must be designed to safely withstand such high pressures during evacuation as well as during periods when internal pressures are alternated in tube reprocessing.

Frequently in the final stages of processing a cathode-ray picture tube, one or more of its internal electronic components is found to be defective under test which necessitates that the evacuated condition be released and the tube be opened for either realignment or replacement of one or more of the electronic components. This is true in processing both monochromatic and polychromatic tubes, although it is more common in the extremely precise requirements of the latter. It has been found in certain manufacturing procedures of monochromatic tubes however that a substantial majority of the rejected tubes on final inspection may be profitably reclaimed by the installation of a new beam gun. To accomplish this the vacuum within the tube must be released and the tube reopened at its neck to facilitate the replacement. In the case of large size tubes which are joined at their sealing edges by a low-melting glass sealing composition, the conversion of the internal pressure from sub-atmospheric to atmospheric introduces excessive stresses in the sealing area. Precautions must be taken to minimize breakage of one or both of glass face plate and funnel portions of the tube envelope, both at the time the envelope is released to atmospheric pressure and for an interval thereafter. Fractures may occur during the period of pressure change or subsequently thereto when the tube is subjected to mild forms of shock.

Accordingly, it is an object of this invention to provide an improved method of providing control over stresses within a hollow glass article in areas most susceptible to fracture during required processing of the article which includes conversion of internal pressure conditions.

Another object of this invention is to provide a simple method of introducing compressive stresses into the sealing area of integrally joined glass parts which constitute an electronic vacuum tube envelope during the period when the tube envelope is reopened for additional processing.

Another object of this invention is to provide a method of applying mechanical controlling and restraining action upon particular areas of a hollow glass television picture tube highly susceptible to the origin of fractures during tube reprocessing which requires widespread fluctuation of internal pressure.

The specific nature of this invention, as well as other objects and advantages thereof, will become apparent to those skilled in the art from the following detailed description, taken in conjunction with the annexed drawings on which, by way of preferred example only, are illustrated the preferred embodiments of this invention.

On the accompanying drawings:

Fig. 1 is an elevational view of a cathode-ray television picture tube having an encompassing compression band.

Fig. 2 is a plan view of the tube and band shown in Fig. 1.

Figs. 3, 4 and 5 are similar plan views of various forms of compression bands for application to a cathode-ray tube.

Fig. 6 is an enlarged view, partly in section, of one portion of Fig. 2.

While this invention will be described as specifically applied to the manufacture of a cathode-ray tube it will be apparent to those skilled in the art that the principles of the invention are equally applicable to the manufacture of any type of evacuated glass envelope.

A preferred embodiment of the present invention consists of a glass cathode-ray picture tube envelope 10 comprised of a funnel 11, face plate 12 and neck 13 which neck is normally sealed at its extremity by one or more beam guns 14. Funnel 11 is frusto-conical in shape with its small end 11a sealed to neck 13 and its large end 11b sealed to face plate 12. Face plate 12 consists of a curved viewing panel 12a bounded by depending annular side panel or flange 12b. Flange 12b and large funnel end 11b terminate in sealing surfaces of complemental contour which are joined either by direct fusion of the glass, by metal bands fused thereto and joined, or by an interposed layer of low-melting glass sealing composition compatible with the thermal characteristics of the rigid glass parts. A combination of the above three methods may also be employed. The overall shape of envelope 10 may be circular or rectangular as conventionally known in the art with the sealing surfaces being reasonably, although not absolutely, planar.

Tube envelope 10 in accordance with the present invention is contemplated as being fully completed and assembled with all its various internal and external electronic components properly installed in operative alignment and subjected to bake-out temperatures and evacuation. However, due to misalignment or malfunction of one or more of the components such as beam gun 14, for example, re-entry into the tube is necessitated to correct these deficiencies. As the internal pressure within the envelope is converted from sub- to existing atmospheric pressure in opening, tensive stresses may occur in the sealing area of the parts and particularly at a joint sealed along the line 18 with a heat-bondable, low-melting glass sealing composition. It is in the area of these localized tensive stresses that restraining action is most beneficially applied.

In order to overcome the loss of rejected tubes after final assembly, it has been discovered that breakage or fracture of glass envelope 10 can be avoided by an extremely tight mechanical or physical grasping of the tube during the period when its evacuation is released to atmospheric pressure, the tube is opened for repair, and the tube is then re-evacuated. A compression member or band 15 is applied to an outer peripheral surface portion of the tube either contiguous with or adjacent to the planar sealing zone while the tube remains evacuated. Band 15 is preferably applied near and approximately parallel to sealing line 18 of the parts as shown on Fig. 1 and tightened therearound. It it this area which upon fluctuation of internal pressure is considered most frangible and highly subject to fracture.

Band 15 is preferably composed of metal such as carbon or stainless steel and fabricated with a shape which follows the cross-sectional contour of the tube in its sealing area generally perpendicular to the tube axis. Band 15 may be prepared having any of the various integral or sectional forms illustrated in Figs. 3, 4, and 5. Padding material 16 such as asbestos cloth may also be employed on the interior of the band to prevent scratching of the glass when the band is tightened thereon.

One or more bolts 17 is employed to draw up at least two outwardly-directed ends 15a of band 15 to exert a continuous annular compressive force upon the sealing zone of envelope 10. In Fig. 1, band 15 is shown in position to apply compressive force to a single peripheral zone near the sealing area of large funnel end 11b. Band 15 may also be fabricated with an inwardly-directed, arcuate cross-section which when drawn tight around the glass will create two spaced-apart juxtaposed annular zones of increased compressive stress which is greater than that normally present in the adjacent and contiguous glass of the tube envelope.

When compression band 15 is applied to the tube, it is necessary that it be attached so as to supply additional compression of a continuous nature in the glass forming the tube wall at or beneath said band. This additional compression, being in excess of that normal to the glass surface without the compression member or band, thereby functions to repress, repel, or limit the origin or rate of travel at which any fracture occurring in the tube side wall may be proceed from its source. Because of the resistance to fracture supplied by this band, limiting or controlling action upon the speed or occurrence of fracture is attained so that breakage is eliminated or very greatly reduced.

Since evacuated glass tubes have been found to frequently fracture on release of the internal vacuum or shortly thereafter, it has been found that moderate tension in band 15 will serve to reduce the incidence of breakage to a neglible percentage. Equipment may be arranged to permit carrying band 15 on tube envelope 10 through repair operations and for its removal either after complete re-evacuation or after partial evacuation prior to or during initial stages of the exhaust-bake. The amount of increased compression introduced into one or more of the parts does not appear to be critical so that a wide range of compressive action may be employed by one or more bands 15 depending upon the particular dimensions and design of the tube envelope.

Experimentation has shown that when a group of 21 diagonal inch rectangular television picture tubes were let down to atmospheric pressure with a single band 15 applied as in Fig. 1, no fractures occurred during the vacuum release or 24 hours subsequent thereto. Such a period of time should provide a sufficient interim to permit installation of a new beam gun or other repairs or realignment of working elements, and return to exhaust-bake procedures after the tube is resealed.

With utilization of the subject method defective vacuumized electronic tubes may be readily reprocessed and incorporated into conventional processing cycles. The compression band may be removed after this reprocessing or may be permitted to remain on the tube exterior to serve as an implosion band for the completed tube. Positioning of the band may be varied through a wide range to reduce breakage to a negligible degree depending upon the particular design, construction, and dimensions of the tube envelope. Thus, the band may be applied to either the face plate or funnel portion of the tube in any predetermined position depending upon the tube seals, angularity, and design.

Various modifications may be resorted to within the spirit and scope of the appended claims.

We claim:

1. The method of preventing glass fracture during reprocessing of a completed sealed and evacuated cathode-ray picture tube, said tube having an envelope comprised primarily of a glass funnel member and glass face plate member hermetically sealed together with a low-melting temperature glass sealant along a peripheral line between said members, said method comprising the steps of applying an additional compressive force along a peripheral surface area of at least one of said members of said envelope adjacent to and parallel with said peripheral sealing line, releasing the evacuated condition within said tube envelope to atmospheric pressure, opening said tube envelope while maintaining said increased compressive force along and parallel to the sealing edge of the said glass member, resealing and reevacuating said tube and removing said additional compressive force.

2. The method of preventing glass fracture during reprocessing of a completed sealed and evacuated cathode-ray picture tube, said tube having an envelope comprised primarily of a glass funnel member and glass face plate member hermetically sealed together with a low-melting temperature glass sealant along a peripheral line between said members, said method comprising the steps of applying an additional compressive force by an exterior annular band along a peripheral surface area of one of said members of said envelope adjacent to and parallel with said peripheral sealing line, releasing the evacuated condition within said tube envelope to atmospheric pressure, opening said tube envelope at said seal line while maintaining said increased compressive force along and parallel to the sealing edge of the said glass member by said annular band, resealing and reevacuating said tube and removing said additional compressive force.

3. The method in accordance with claim 2, including the step of applying an additional compressive force by an exterior annular metallic band along a peripheral surface area of said funnel member of said envelope adjacent to and parallel with its peripheral sealing line.

References Cited in the file of this patent

UNITED STATES PATENTS

| 2,607,169 | Randels | Aug. 19, 1952 |
| 2,785,820 | Vincent et al. | Mar. 19, 1957 |

FOREIGN PATENTS

| 482,517 | France | Jan. 2, 1917 |